(12) United States Patent
Li et al.

(10) Patent No.: US 11,310,047 B2
(45) Date of Patent: Apr. 19, 2022

(54) METHOD AND APPARATUS FOR CONFIGURING LOCAL CONSENSUS AND COMPUTER-READABLE STORAGE MEDIUM

(71) Applicant: ZhongAn Information Technology Services Co., Ltd., Shenzhen (CN)

(72) Inventors: Ming Li, Shanghai (CN); Junjun Du, Shanghai (CN)

(73) Assignee: ZhongAn Information Technology Services Co., Ltd., Shenzhen (CN)

( * ) Notice: Subject to any disclaimer, the term of this patent is extended or adjusted under 35 U.S.C. 154(b) by 585 days.

(21) Appl. No.: 16/311,670

(22) PCT Filed: Mar. 7, 2018

(86) PCT No.: PCT/CN2018/078301
§ 371 (c)(1),
(2) Date: Dec. 19, 2018

(87) PCT Pub. No.: WO2019/024500
PCT Pub. Date: Feb. 7, 2019

(65) Prior Publication Data
US 2021/0234698 A1   Jul. 29, 2021

(30) Foreign Application Priority Data
Jul. 31, 2017   (CN) .......................... 201710638187.1

(51) Int. Cl.
*H04L 9/32*   (2006.01)
*H04L 29/08*   (2006.01)
(Continued)

(52) U.S. Cl.
CPC .......... *H04L 9/3218* (2013.01); *H04L 9/0825* (2013.01); *H04L 67/16* (2013.01); *H04L 2209/38* (2013.01); *H04L 2209/463* (2013.01)

(58) Field of Classification Search
CPC ..... H04L 9/3218; H04L 67/16; H04L 9/0825; H04L 2209/38; H04L 2209/463; H04L 9/32; H04L 29/08; H04L 9/08
See application file for complete search history.

(56) References Cited

U.S. PATENT DOCUMENTS 88,747,769     10/2014  Mao et al.
2015/0095648 A1*  4/2015  Nix .......................... G06F 21/35
                                                               713/170
(Continued)

FOREIGN PATENT DOCUMENTS

CN      105976231      9/2016
CN      106157142      11/2016
(Continued)

OTHER PUBLICATIONS

International Bureau, "International Search Report," issued in connection with application No. PCT/CN2018/078301, dated Jun. 1, 2018, 4 pages.
(Continued)

*Primary Examiner* — Quazi Farooqui
(74) *Attorney, Agent, or Firm* — Hanley, Flight & Zimmerman, LLC

(57) ABSTRACT

The present disclosure discloses a method for configuring a block chain-based local consensus, including implementing an initialization of a plurality of nodes and creating a local consensus instance for a set of nodes selected from the plurality of nodes. The present disclosure also discloses a corresponding computer-readable storage medium and an apparatus for configuring a block chain-based local consensus. The apparatus including an initialization module configured to implement an initialization of a plurality of nodes; and a local consensus configuration module configured to create a local consensus instance for a set of nodes selected from the plurality of nodes. The method for configuring a (Continued)

block chain-based local consensus according to the present disclosure can select, from the plurality of nodes, the relevant nodes that are a part of the plurality of nodes, thereby establishing a local consensus instance among the selected nodes, in turn to ensure that the local consensus instance can select its desired consensus algorithm, so as to optimize the network and improve the network service quality.

18 Claims, 3 Drawing Sheets

(51) Int. Cl.
*H04L 9/08* (2006.01)
*H04L 67/51* (2022.01)

(56) References Cited

U.S. PATENT DOCUMENTS

| | | | |
|---|---|---|---|
| 2015/0324444 A1* | 11/2015 | Chercoles S Nchez | ........................ G06F 16/285 707/703 |
| 2016/0260091 A1 | 9/2016 | Tobias | |
| 2017/0046526 A1 | 2/2017 | Chan et al. | |
| 2017/0053002 A1 | 2/2017 | Bowman et al. | |
| 2017/0289134 A1* | 10/2017 | Bradley | ................ H04L 63/105 |
| 2020/0007558 A1* | 1/2020 | Inokuchi | ............. G06F 16/2308 |
| 2020/0090096 A1* | 3/2020 | Inokuchi | ................ G06Q 10/06 |

FOREIGN PATENT DOCUMENTS

| | | |
|---|---|---|
| CN | 106603698 | 4/2017 |
| CN | 106682984 | 5/2017 |
| CN | 10678071 | 6/2017 |
| CN | 106850536 | 6/2017 |
| CN | 106874087 | 6/2017 |
| CN | 107360248 | 11/2017 |
| CN | 107450981 | 12/2017 |
| CN | 107733651 | 2/2018 |
| JP | 2014526171 | 10/2014 |
| WO | 2016177026 | 11/2016 |
| WO | 2019024500 | 2/2019 |

OTHER PUBLICATIONS

State Intellectual Property Office of China, "Office Action," issued in connection with application No. 201710638187.1, dated May 30, 2019, 8 pages.

Taiwan Patent Office, "Office Action," issued in connection with application No. 107125335, dated Jun. 12, 2019, 10 pages.

Australian Government, "Examination Report No. 1," issued in connection with application No. 2018233013, dated Jul. 29, 2019, 7 pages.

Japanese Patent Office, "Notice of Reasons for Refusal," issued in connection with patent application No. 2018-548114, dated Oct. 18, 2019, 9 pages. (English translation provided).

Intellectual Property Office of Singapore, "Search Report," issued on connection with patent application No. 11201807918P, dated Sep. 17, 2019, 2 pages.

Intellectual Property Office of Singapore, "Written Opinion," issued on connection with patent application No. 11201807918P, dated Sep. 18, 2019, 5 pages.

Taiwan Intellectual Property Office, "Office Action," issued in connection with patent application No. 10712335, dated Jan. 22, 2020, 5 pages.

The State Intellectual Property Office of People's Republic of China, "Second Office Action," issued in connection with patent application No. 201710638187.1, dated Dec. 10, 2019, 9 pages. (English translation provided).

McConaghy et al., "BigchainDB: A Scalable Blockchain Database," ascribe GmbH, Berlin, Germany, dated Jun. 8, 2016, 65 pages.

Sakuji Kaji, "Realize Transperancy and Fairness, Block Chain Technology," Information Processing vol. 57 No. 9, Sep. 2016, 6 pages.

* cited by examiner

METHOD AND APPARATUS FOR CONFIGURING LOCAL CONSENSUS AND COMPUTER-READABLE STORAGE MEDIUM

FIELD OF THE DISCLOSURE

The present disclosure relates to the field of block chain technology, and in particular, to a method for configuring a block chain-based local consensus, an apparatus for configuring a block chain-based local consensus, and a corresponding tangible computer-readable storage medium.

BACKGROUND

Block chain technology is a decentralization-based peer-to-peer network technology that combines cryptographic principles with consensus mechanisms to ensure data coherence and continuity of distributed nodes, thereby achieving the purpose for information immediate validation, traceability, tamper resistance, and block resistance, in turn to create a set of private, high-efficient, and secure shared value systems.

Block chains are generally classified into public block chains, consortium block chains, and private block chains according to the access rights. Among them, the public block chain refers to the block chain to which anyone can access according to an agreement and participate in the consensus; the consortium block chain refers to the block chain which is controlled by the preselected node during its consensus; the private block chain refers to a block chain whose all permissions are in one organization, and which is controlled by the organization arbitrarily.

A consensus algorithm refers to a set of protocols operated and followed by a plurality of nodes participated in the block chain, to ensure that the request operation (sometimes also comprising an execution result) submitted to the block chain can reach an agreement among the plurality of nodes in the block chain.

In the existing block chain technology, the consensus algorithms selected by different block chain platforms also have their own merits and differences. From the view of technical indicators, different consensus algorithms have large differences in indicators, such as system availability, extensibility and consensus confirmation speed, etc., and thus there is no perfect consensus algorithm to meet all scenarios. Therefore, in the practice of the actual block chain, it is often necessary to select a suitable consensus algorithm according to the actual usage scenario and technical indicators.

SUMMARY

Since the block chain platforms currently in the market substantially support one single consensus algorithm, even if a consensus module is a pluggable consensus module, it allows only one consensus algorithm to run at the same time, so the flexibility of the existing block chain platforms is poor to be not able to satisfy multiple different service scenarios simultaneously. In addition, in some scenarios, in reality, a subset of nodes needs to be selected to compose a sub-chain to run some particular block chain services, and other irrelevant nodes are not allowed to receive messages, which cannot be achieved in the existing block chain platforms.

For the above-described problems, a first aspect of the present disclosure discloses a method for configuring a block chain-based local consensus, the method comprising: implementing an initialization of a plurality of nodes; and creating a local consensus instance for a set of nodes selected from the plurality of nodes.

The method for configuring a block chain-based local consensus according to the present disclosure can select, from the plurality of nodes, relevant nodes that are a part of a plurality of nodes, thereby establishing a local consensus instance among the selected nodes, in turn to ensure that the local consensus instance can select its desired consensus algorithm, so as to optimize the network and improve the network service quality.

In one embodiment in accordance with the present disclosure, creating a local consensus instance for a set of nodes selected from the plurality of nodes further comprises:
selecting the set of nodes from the plurality of nodes according to a service demand running on the local consensus instance to be created;
broadcasting a first transaction command for creating the local consensus instance to all the nodes in the block chain via one of the plurality of nodes; and
all the nodes in the block chain responding to the first transaction command to create the local consensus instance.

In this way, the administrator of the block chain can select the set of nodes from the plurality of nodes according to the service demand running on the local consensus instance to be created, so that the local consensus instance is established among the selected set of nodes, and other irrelevant nodes do not need to or are not able to participate in the local consensus instance. On one hand, this will ensure the security and privacy of communication among the set of nodes, on the other hand, it is also possible to ensure that the created local consensus instance is relatively free to select its desired consensus algorithm.

In one embodiment in accordance with the first transaction command comprises information indicating a node list of the set of nodes, information related to a local consensus identifier specified by an administrator of the block chain, and information related to a consensus algorithm used by the created local consensus instance.

In one embodiment in accordance with the present disclosure, the consensus algorithm comprises at least one of the following algorithms: proof of work consensus algorithm; proof of stake consensus algorithm; delegated proof of stake consensus algorithm; Practical Byzantine Fault Tolerance consensus algorithm; and/or BFT-RAFT consensus algorithm. Among them, proof of work (POW) consensus algorithm, such as used by Bitcoin, is mostly used in public block chains; proof of stake (POS) consensus algorithm, which is tried by Ethereum, is mostly used in public block chains; delegated proof of stake (DPOS) consensus algorithm which is a variant of POS consensus algorithm is mostly used in the public block chain; Practical Byzantine Fault Tolerance (PBFT) consensus algorithm is mostly used in the consortium block chains; and in 2014, a newly proposed distributed consensus algorithm—BFT-RAFT consensus algorithm, which is similar to PBFT, is mostly used in distributed systems and consortium block chains.

In one embodiment in accordance with the present disclosure, the information related to a consensus algorithm used by the created local consensus instance is determined based on the service demand running on the local consensus instance to be created and the consensus algorithm supported by the block chain.

In an embodiment in accordance with the present disclosure, the method further comprises one or more communication channels being created by the local consensus instance according to the type of a consensus algorithm used by the local consensus instance. In an embodiment in accordance with the present disclosure, the method further comprises a message processing thread for receiving and processing message transmitted from other nodes being initiated by the created local consensus instance.

In one embodiment in accordance with the present disclosure, the method further comprises:

broadcasting a second transaction command for deleting the local consensus instance to all the nodes in the block chain after completing the service demand running on the local consensus instance; and all the nodes in the block chain responding to the second transaction command to delete the local consensus instance.

In this way, after completing the service demand running on the local consensus instance, the administrator of the block chain can delete the local consensus instance in time, thereby releasing the corresponding network resources, so as to utilize the block chain network resource optimally.

In one embodiment in accordance with the present disclosure, implementing an initialization of a plurality of nodes further comprises:

configuring network addresses and ports for the plurality of nodes;

generating node public and private keys; and initiating and running a node block chain program.

Furthermore, the second aspect of the present disclosure discloses a tangible computer-readable storage medium, the storage medium comprising instructions that, when executed, cause a processor of the computer at least to:

implement an initialization of a plurality of nodes; and create a local consensus instance for a set of nodes selected from the plurality of nodes.

In one embodiment in accordance with the present disclosure, to create a local consensus instance for a set of nodes selected from the plurality of nodes further comprises:

select the set of nodes from the plurality of nodes according to a service demand running on the local consensus instance to be created;

broadcast a first transaction command for creating the local consensus instance to all the nodes in the block chain via one of the plurality of nodes; and all the nodes in the block chain responding to the second transaction command to delete the local consensus instance.

In one embodiment in accordance with the present disclosure, when executed, the instructions cause the processor of the computer further to:

broadcast a second transaction command for deleting the local consensus instance to all the nodes in the block chain after completing the service demand running on the local consensus instance; and cause all the nodes in the block chain to respond to the second transaction command to delete the local consensus instance.

Finally, a third aspect of the present disclosure discloses an apparatus for configuring a block chain-based local consensus, the apparatus comprising:

an initialization module configured to implement an initialization of a plurality of nodes; and a local consensus configuration module configured to create a local consensus instance for a set of nodes selected from the plurality of nodes.

In one embodiment in accordance with the present disclosure, the local consensus configuration module is further configured to:

select the set of nodes from the plurality of nodes according to a service demand running on the local consensus instance to be created;

broadcast a first transaction command for creating the local consensus instance to all the nodes in the block chain via one of the plurality of nodes; and cause all the nodes in the block chain to respond to the first transaction command to create the local consensus instance.

In one embodiment in accordance with the present disclosure, the first transaction command comprises information indicating a node list of the set of nodes, information related to a local consensus identifier specified by an administrator of the block chain, and information related to a consensus algorithm used by the created local consensus instance.

In one embodiment in accordance with the present disclosure, the consensus algorithm comprises at least one of the following algorithms:

proof of work consensus algorithm;

proof of stake consensus algorithm;

delegated proof of stake consensus algorithm;

Practical Byzantine Fault Tolerance consensus algorithm; and/or

BFT-RAFT consensus algorithm.

In one embodiment in accordance with the present disclosure, the information related to a consensus algorithm used by the created local consensus instance is determined based on the service demand running on the local consensus instance to be created and the consensus algorithm supported by the block chain.

In one embodiment in accordance with the present disclosure, the local consensus configuration module is further configured to:

broadcast a second transaction command for deleting the local consensus instance to all the nodes in the block chain after completing the service demand running on the local consensus instance; and cause all the nodes in the block chain to respond to the first transaction command to create the local consensus instance.

Method, apparatus, and corresponding computer-readable storage medium for configuring a block chain-based local consensus according to the present disclosure can select, from the plurality of nodes, the relevant nodes that are a part of a plurality of nodes, thereby establishing a local consensus instance among the selected nodes, in turn to ensure that the local consensus instance can select its desired consensus algorithm, so as to optimize the network and improve the network service quality.

BRIEF DESCRIPTION OF THE DRAWINGS

The features, advantages, and other aspects of various embodiments of the present disclosure will become more apparent in conjunction with the drawings and the following detailed description, here illustrates several embodiments of the present disclosure by way of example and not limitation, in the drawings.

DETAILED DESCRIPTION

Figure 1:
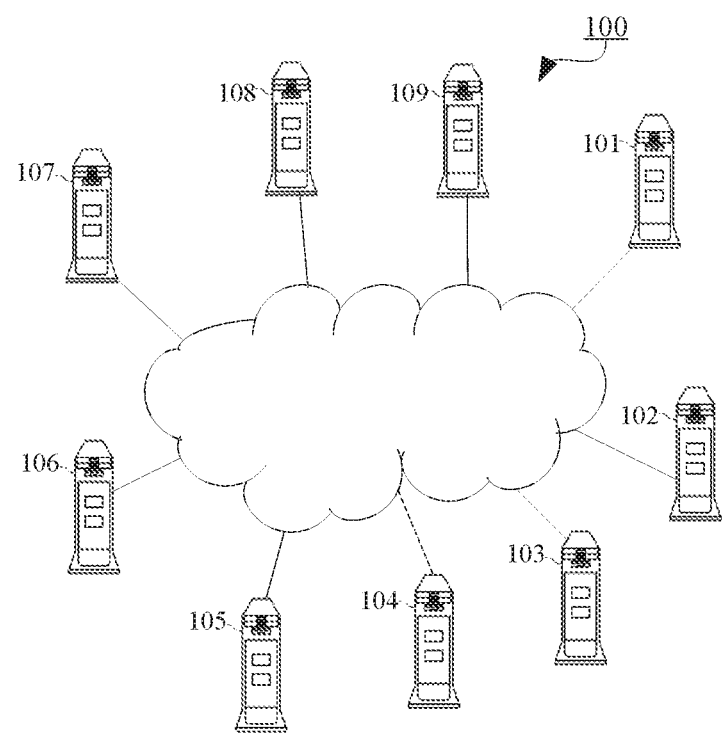
FIG. 1 is a schematic diagram of a network structure 100 of a block chain in the prior art.

Various exemplary embodiments of the present disclosure are described in detail below with reference to the accompanying drawings. The flowchart and block diagrams in the figures illustrate the architecture, functionality, and operation of methods and systems in accordance with various embodiments of the present disclosure which are possibly implemented. It should be noted that each block of the flowchart or block diagrams, which may represent one module, a section of a program, or a portion of a code, may comprise one or more components for implementing executable instructions of the specified logical function in various embodiments. It should also be noted that in some implementations as alternatives, the functions noted in the blocks may occur in an order other than as noted in the drawings. For example, two blocks represented in succession may in fact be executed substantially in parallel, or they may sometimes be executed in the reverse order, depending on the function involved. It should also be noted that each block of the flowcharts and/or block diagrams, and combinations of blocks in the flowcharts and/or block diagrams, can be implemented using dedicated hardware-based systems that perform the specified functions or operations, or it can be implemented using a combination of dedicated hardware and computer instructions.

The terms "comprising", "including", and the like, as used herein, should be construed as open-ended terms, i.e., "comprising/including but not limited to," indicating that other content may also be comprised. The term "based on" is "based at least in part on". The term "one embodiment" means "at least one embodiment"; the term "another embodiment" means "at least one other embodiment", and the like.

Techniques, methods, and devices known to those of ordinary skill in the relevant art may not be discussed in detail, but in an appropriate case, the techniques, methods and devices should be considered as part of the specification. For the connection between the units in the drawings is merely for convenience of description, which represents that at least the units at both ends of the connection communicate with each other, and is not intended to limit that the communication between unconnected units cannot be achieved.

FIG. 1 is a schematic diagram of a network structure 100 of a block chain in the prior art. As can be seen from FIG. 1, the block chain platform 100 includes, but is not limited to, terminals 101, 102, 103, 104, 105, 106, 107, 108, and 109 connected by a network, wherein the terminals 101, 103, 104 are connected to other block chain terminals through the wireless network, while the terminals 102, 105, 106, 107, 108, and 109 are connected to the other block chain terminals through the wired network. However, there are following technical problems in such a block chain platform, namely the block chain platforms currently in the market substantially support one single consensus algorithm, even if a consensus module is a pluggable consensus module, it allows only one consensus algorithm to run at the same time, so the flexibility of the existing block chain platforms is poor to be not able to satisfy multiple different service scenarios simultaneously. The actual demand corresponding to the above is that in some scenarios, in reality, a subset of nodes needs to be selected to compose a sub-chain to run some particular block chain service, and other irrelevant nodes are not allowed to receive messages, which cannot be achieved in the existing block chain platforms.

In addition, from the consensus algorithms selected by specific block chain platforms, they also have their own merits and differences, from the view of technical indicators, different consensus algorithms have large differences in indicators, such as system availability, extensibility, and consensus confirmation speed, etc., and thus there is no perfect consensus algorithm to meet all scenarios. Therefore, in the practice of the actual block chain, it is often necessary to select a suitable consensus algorithm according to the actual usage scenario and technical indicators.

As a result of research, researchers in the present disclosure have found that on a large block chain platform, relevant nodes that need to participate in a specific service can be selected from these nodes according to a service demand, and a local consensus instance can be established among these relevant nodes, which enables to ensure the security and privacy of communications among the local consensus instances. In addition, a consensus algorithm can be selected for the local consensus instance individually, such that the selection of the consensus algorithm running on the local consensus instance is more pertinent to be able to optimize the operation of the block chain.

Figure 2:
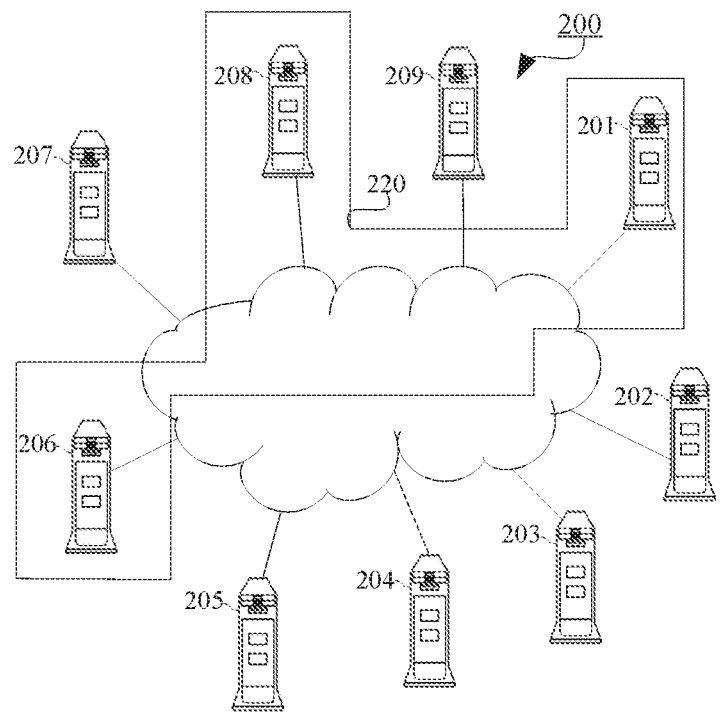
FIG. 2 is a schematic diagram of a network structure 200 of a block chain according to the present disclosure.

The concept according to the present disclosure will be described below with reference to FIG. 2. For example, in the block chain platform shown in FIG. 1, a bank customer A (i.e., illustrated node 201) and an insurance customer B (illustrated node 206), and another insurance customer C (illustrated node 208) establish one sub-chain, i.e., a local consensus instance. At this time, the administrator of the block chain can specify an identifier of the local consensus instance (e.g., "reimbursement platform"), and select, from these nodes, the relevant nodes (i.e., nodes 201, 206, and 208, represented by block 220) which need to participate in the specific service for the local consensus instance, and select a corresponding consensus algorithm (e.g., a Practical Byzantine Fault Tolerance consensus algorithm) for the local consensus instance, however, those skilled in the art should appreciate that the identifier of the local consensus instance, the selected relevant nodes (i.e., nodes 201, 206, and 208), and the selected Practical Byzantine Fault Tolerance consensus algorithm here are all exemplary and non-limited, and other nodes, other consensus algorithms, and identifiers that specify other local consensus instances can also be selected when they meet the requirements. The administrator of the block chain then broadcasts a first transaction command for creating the local consensus instance to all the nodes in the block chain through any of the nodes in the block chain, and all the nodes in the block chain respond to the first transaction command to create the local consensus instance. As a result, the local consensus instance according to the present disclosure has been created, and it can be seen that the first transaction command includes information indicating a node list of the set of nodes (i.e., information indicating to include the nodes 201, 206, and 208), information related to a local consensus identifiers specified by an administrator of the block chain (i.e., information related to for example, "reimbursement platform"), and information related to a consensus algorithm used by the created local consensus instance (i.e., for example, information related to Practical Byzantine Fault Tolerance consensus algorithm). A method for configuring a block chain-based local consensus according to the present disclosure can select from the plurality of nodes the relevant nodes that are a part of the plurality of nodes, thereby establishing a local consensus instance among the selected nodes, in turn to ensure that this local consensus instance can select its desired consensus algorithm, so as to optimize the network and improve the network service quality.

After creating the local consensus instance, the local consensus instance creates one or more communication channels according to the type of consensus algorithm (e.g., Practical Byzantine Fault Tolerance consensus algorithm) used by the local consensus instance. Subsequently, the created local consensus instance initiates a message processing thread for receiving and processing message transmitted from other nodes. After completing the service demand running on the local consensus instance, a second transaction command for deleting the local consensus instance is broadcasted to all the nodes in the block chain, and all the nodes in the block chain respond to the second transaction command to delete the local consensus instance. In this manner, after completing the service demand running on the local consensus instance, the administrator of the block chain can delete the local consensus instance in time, thereby releasing the corresponding network resources, and thus to utilize this block chain network resource optimally.

Figure 3:
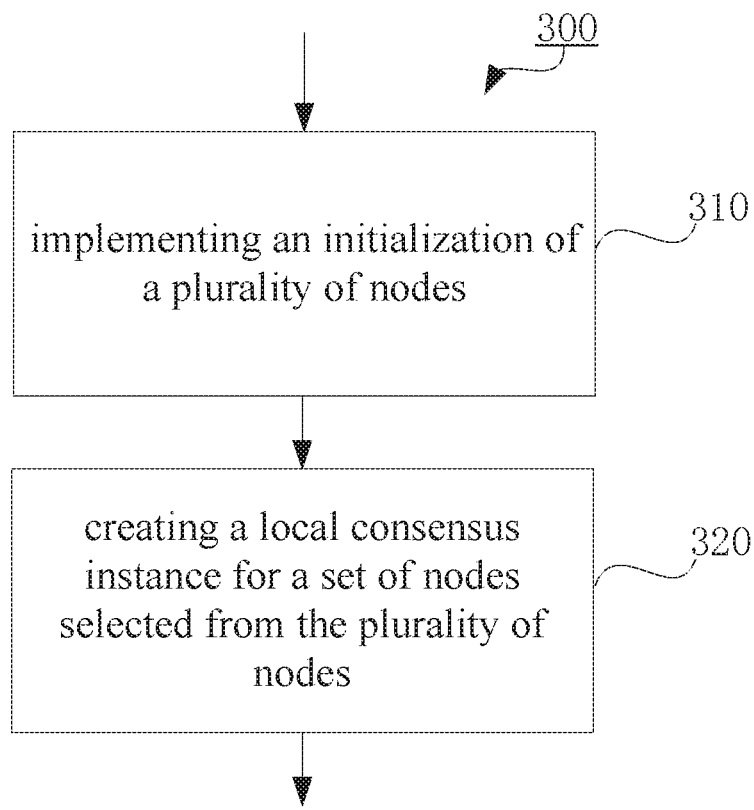
FIG. 3 is a flowchart of a method 300 for configuring a block chain-based local consensus according to the present disclosure.

A method 300 for configuring a block chain-based local consensus according with the present disclosure is further described below with reference to FIG. 3, the method 300 includes the following steps, i.e., firstly, in the step 310 of the method, implementing an initialization of a plurality of nodes; then in the step 320 of the method, creating a local consensus instance for a set of nodes selected from the plurality of nodes. In one embodiment, the step 320 of the method further includes selecting the set of nodes from the plurality of nodes according to a service demand running on the local consensus instance to be created; broadcasting a first transaction command for creating the local consensus instance to all the nodes in the block chain via one of the plurality of nodes; and all the nodes in the block chain responding to the first transaction command to create the local consensus instance. The first transaction command includes information indicating a node list of the set of nodes, information related to a local consensus identifier specified by an administrator of the block chain, and information related to a consensus algorithm used by the created local consensus instance. The method step 310 further comprises configuring network addresses and ports for the plurality of nodes; generating node public and private keys; and initiating and running a node block chain program.

The above-described consensus algorithm includes at least one of the following algorithms: proof of work consensus algorithm; proof of stake consensus algorithm; delegated proof of stake consensus algorithm; Practical Byzantine Fault Tolerance consensus algorithm; and/or BFT-RAFT consensus algorithm. Among them, proof of work (POW) consensus algorithm, such as used by Bitcoin, is mostly used in public block chains; proof of stake (POS) consensus algorithm, which is tried by Ethereum, is mostly used in public block chains; delegated proof of stake (DPOS) consensus algorithm which is a variant of POS consensus algorithm is mostly used in the public block chain; Practical Byzantine Fault Tolerance (PBFT) consensus algorithm is mostly used in the consortium block chains; and in 2014, a newly proposed distributed consensus algorithm—BFT-RAFT consensus algorithm, which is similar to PBFT, is mostly used in distributed systems and consortium block chains.

More specifically, the information relevant to a consensus algorithm used by the created local consensus instance is determined based on the service demand running on the local consensus instance to be created and the consensus algorithm supported by the block chain.

The above configuration method can be implemented by means of a tangible computer-readable storage medium, the storage medium comprising instructions that, when executed, cause a processor of the computer to at least implement an initialization of a plurality of nodes; and create a local consensus instance for a set of nodes selected from the plurality of nodes. In addition, when executed, the instructions enable the processor of the computer to select the set of nodes from the plurality of nodes according to a service demand running on the local consensus instance to be created, broadcast a first transaction command for creating the local consensus instance to all the nodes in the block chain via one of the plurality of node, and all the nodes in the block chain responding to the second transaction command to delete the local consensus instance. In one embodiment according to the present disclosure, when executed, the instructions cause the processor of the computer further to broadcast a second transaction command for deleting the local consensus instance to all the nodes in the block chain after completing the service demand running on the local consensus instance; and cause all the nodes in the block chain to respond to the second transaction command to delete the local consensus instance.

Alternatively, the above configuration method can be implemented by a computer program product. The computer program product may comprise a computer-readable storage medium having computer readable program instructions thereon for carrying out aspects of the present disclosure. The computer-readable storage medium may be a tangible device that can hold and store instructions used by an instruction execution device. The computer-readable storage medium may be, but not limited to, an electrical storage device, a magnetic storage device, an optical storage device, an electromagnetic storage device, a semiconductor storage device, or any suitable combination of the above. More specific examples (non-exhaustive lists) of the computer-readable storage media comprise portable computer disks, hard disks, random access memory (RAM), read only memory (ROM), erasable programmable read only memory (EPROM or flash memory), static random access memory (SRAM), portable compact disk read-only memory (CD-ROM), digital versatile disk (DVD), memory stick, floppy disk, mechanical coding device, for example, punch-out cards or groove inner protrusion structures on which instructions are stored, as well as any suitable combination of the above. The computer-readable storage media as used here is not to be construed as an instantaneous signal per se, such as radio waves or other freely propagating electromagnetic waves, electromagnetic waves propagating through waveguides or other transmission media (e.g., optical pulses through optical fiber cables), or electrical signals propagating through the wired transmission.

Figure 4:
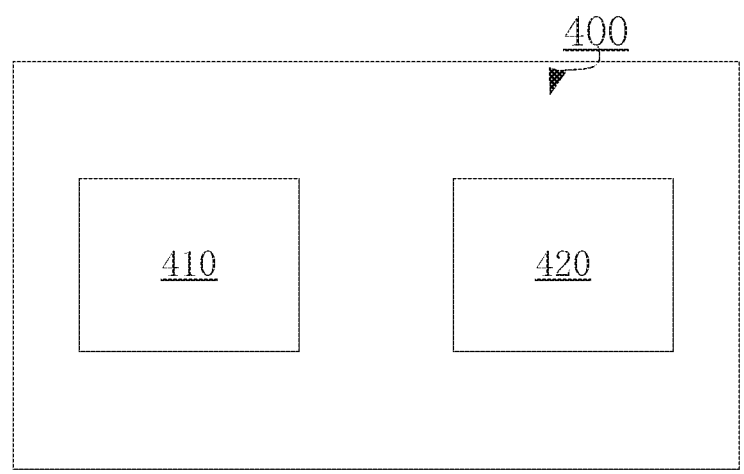
FIG. 4 is a schematic diagram of an apparatus 400 for configuring a block chain-based local consensus according to the present disclosure.

FIG. 4 is a schematic diagram of an apparatus 400 for configuring a block chain-based local consensus according to the present disclosure. It can be seen from the figure that the apparatus 400 for configuring a block chain-based local consensus includes an initialization module 410 configured to implement an initialization of a plurality of nodes. In addition, the apparatus 400 for configuring a block chain-based local consensus further includes a local consensus configuration module 420 configured to create a local consensus instance for a set of nodes selected from the plurality of nodes. In addition, the local consensus configuration module 420 can be further configured to select the set of nodes from the plurality of nodes according to a service demand running on the local consensus instance to be created, broadcast a first transaction command for creating the local consensus instance to all the nodes in the block chain via one of the plurality of nodes; and cause all the nodes in the block chain to respond to the first transaction command to create the local consensus instance. The first transaction command includes information indicating a node list of the set of nodes, information related to a local consensus identifier specified by an administrator of the block chain, and information related to a consensus algorithm used by the created local consensus instance. The consensus algorithm includes at least one of the following algorithms: proof of work consensus algorithm, proof of stake consensus algorithm, delegated proof of stake consensus algorithm, Practical Byzantine Fault Tolerance consensus algorithm, and/or BFT-RAFT consensus algorithm. In one embodiment according to the present disclosure, the local consensus configuration module is further configured to broadcast a second transaction command for deleting the local consensus instance to all the nodes in the block chain after completing the service demand running on the local consensus instance; and cause all the nodes in the block chain to respond to the first transaction command to create the local consensus instance.

Method, apparatus, and corresponding computer-readable storage medium for configuring a block chain-based local consensus according to the present disclosure can select from the plurality of nodes the relevant nodes that are a part of a plurality of nodes, thereby establishing a local consensus instance among the selected nodes, in turn to ensure that the local consensus instance can select its desired consensus algorithm, so as to optimize the network and improve the network service quality.

Figure 5:
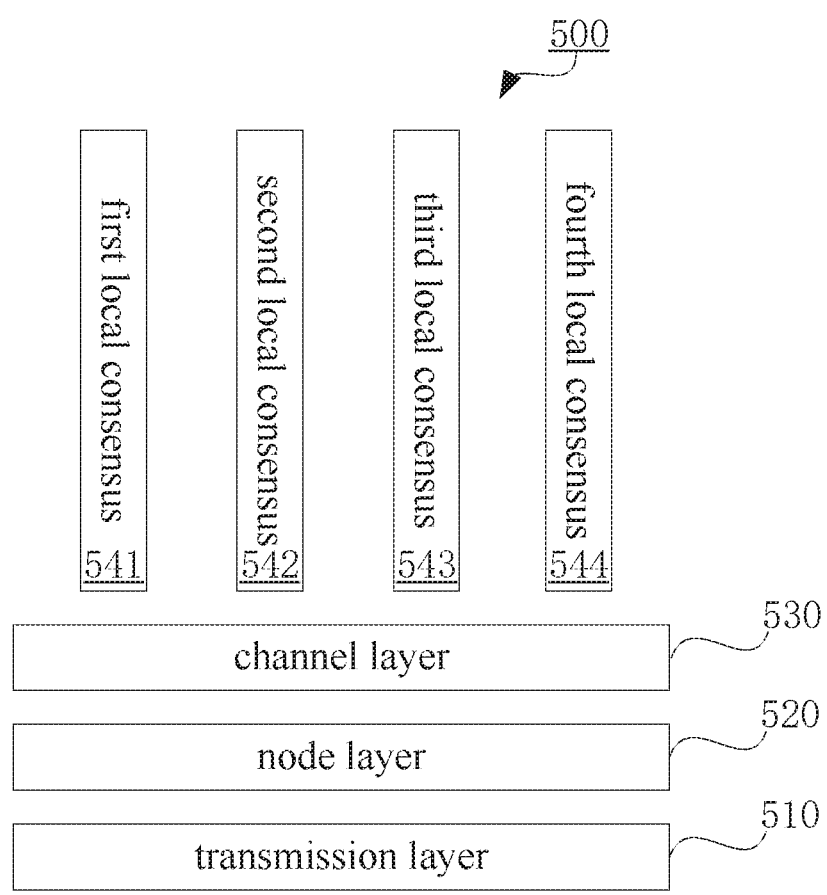
FIG. 5 illustrates a schematic diagram of a plurality of embodiments 500 for a local consensus implemented according to the present disclosure.

An embodiment 500 of a plurality of local consensuses implemented by the proposed method according to the present disclosure is further described below in conjunction with FIG. 5. It can be seen from the figure that the transmission layer 510 is a peer to peer network connection layer which is responsible for maintaining the physical connections between nodes. The node layer 520 is used for maintaining the network address, the port, and the public and private keys information of each node and completing handshake, signature and the verification processing. Then, multiple channels can be created on the channel layer 530, among multiple nodes, only channels with the same ID can communicate with each other, each local consensus instance can dynamically create and delete channels, while the ID of each channel cannot be repeated, which means that the ID of each channel is unique. On the consensus algorithm layer, however, each consensus algorithm specifies a set of nodes, creates one or more channels to communicate with the corresponding channels of other nodes, and processes the received channel messages. In addition, the created consensus algorithms (e.g., first local consensus 541, second local consensus 542, third local consensus 543, and fourth local consensus 544) may be created, modified, and/or deleted dynamically.

In the view of the network establishment, the establishment of a local consensus instance includes two phases. In the first phase, an initialization of a plurality of nodes is implemented. Implementing an initialization of a plurality of nodes includes configuring the node network address and port, generating node public and private keys, and initiating and running a node block chain program. Then, in the second phase, a local consensus will be initiated. Initiating a local consensus, however, comprising determining the string ID of the local consensus, and the ID cannot be repeated; then determining the participated set of nodes and the consensus algorithm of the local consensus, it should be noted that the consensus algorithm must be a consensus algorithm supported by the platform; then, using the identity of the administrator to initiate one transaction command for creating a local consensus, meanwhile submitting the string ID, the set of nodes, and the consensus algorithm of the local consensus. The transaction is automatically created on the selected nodes after the network-wide conformation, and the local consensus instance is initiated; the newly created local consensus instances create one or more communication channels (channels) to communicate with each other, and the newly created local consensuses initiate message processing threads to receive and process the messages transmitted from other nodes. Lastly, if the local consensus finishes a task and needs to stop, a transaction command for deleting the local consensus only needs to be initiated using the identity of the administrator.

Compared with the prior art, the method of the present invention has the advantages of the following aspects:

Firstly, the method can initiate/stop one new local consensus without redeployment or restarting, just needs to select the nodes to participate in the local consensus and select a suitable consensus algorithm, create the local consensus dynamically through the creating new local consensus command supported by the platform, and utilize the local consensus in time. When not needed, the specified local consensus is stopped by the stopping the local consensus command supported by the platform.

Secondly, the method can simultaneously support a plurality of local consensuses which are running synchronically, and the local consensuses are completely isolated from each other logically and are not able to affect each other: i.e., local consensus are not visible to each other, so different local consensus can select completely different consensus algorithms arbitrarily, which has greater flexibility.

Finally, the local consensus supported by this method can be free to select a completely different set of nodes. The message of each local consensus is strictly limited to be passed among the specified set of nodes, other irrelevant nodes will not receive the consensus message, which has better privacy. It can be well satisfied that some nodes are running in a scenario that belongs to a small range of the block chain application, which has stronger data privacy and security.

It should be noted that although several apparatus s or sub-apparatus of the device mentioned in the above detailed description, such division is merely exemplary and not mandatory. In fact, according to the embodiments of the present disclosure, the features and functions of two or more above-described apparatus may be embodied in one apparatus. Conversely, the features and functions of one apparatus described above may be further divided into a plurality of apparatuses to embody.

The foregoing descriptions are merely optional embodiments of the present disclosure, and are not intended to limit the embodiments of the present disclosure. For those skilled in the art, various modifications and changes may be made to the embodiments of the present disclosure. Any modification, equivalent replacement, improvement and the like made within the spirit and principle of the embodiments of the present disclosure should be included in the protection scope of the embodiments of the present disclosure.

Although the embodiments of the present disclosure have been described with reference to several specific embodiments, it should be understood that the embodiments of the present disclosure are not limited to the specific embodiments disclosed. The embodiments of the present disclosure are intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for configuring a block chain-based local consensus, the method comprising:
   implementing an initialization of a plurality of nodes;
   selecting a set of nodes from the plurality of nodes according to a service demand running on a local consensus instance to be created; and
   creating the local consensus instance for the selected set of nodes by:
      broadcasting a first transaction command for creating the local consensus instance to the nodes in the block chain via one of the plurality of nodes, wherein the nodes in the block chain respond to the first transaction command to create the local consensus instance.

2. The method of claim 1, wherein the first transaction command includes information indicating a node list of the set of nodes, information related to a local consensus identifier specified by an administrator of the block chain, and information related to a consensus algorithm used by the created local consensus instance.

3. The method according to claim 2, wherein the consensus algorithm comprises at least one of the following algorithms:
   proof of work consensus algorithm;
   proof of stake consensus algorithm;
   delegated proof of stake consensus algorithm;
   Practical Byzantine Fault Tolerance consensus algorithm; and/or
   BFT-RAFT consensus algorithm.

4. The method according to claim 2, wherein the information related to a consensus algorithm used by the created local consensus instance is determined based on the service demand running on the local consensus instance to be created and the consensus algorithm supported by the block chain.

5. The method of claim 1, wherein the method further comprises:
   one or more communication channels being created by the local consensus instance according to the type of a consensus algorithm used by the local consensus instance.

6. The method of claim 1, wherein the method further comprises:
   a message processing thread for receiving and processing message transmitted from other nodes being initiated by the created local consensus instance.

7. The method according to claim 1, wherein the method further comprises:
   broadcasting a second transaction command for deleting the local consensus instance to all the nodes in the block chain after completing the service demand running on the local consensus instance; and
   all the nodes in the block chain responding to the second transaction command to delete the local consensus instance.

8. The method of claim 1, wherein implementing an initialization of a plurality of nodes further comprises:
   configuring network addresses and ports for the plurality of nodes;
   generating node public and private keys; and
   initiating and running a node block chain program.

9. A tangible computer-readable storage medium, the storage medium comprising instructions that, when executed, cause a processor of the computer to at least:
   implement an initialization of a plurality of nodes;
   select a set of nodes from the plurality of nodes according to a service demand running on a local consensus instance to be created; and
   create the local consensus instance for the selected set of nodes by:
      broadcasting a first transaction command for creating the local consensus instance to the nodes in the block chain via one of the plurality of nodes, wherein the nodes in the block chain respond to the first transaction command to create the local consensus instance.

10. The computer-readable storage medium of claim 9, wherein when executed, the instructions cause the processor of the computer further to:
    broadcast a second transaction command for deleting the local consensus instance to all the nodes in the block chain after completing the service demand running on the local consensus instance; and
    cause all the nodes in the block chain to respond to the second transaction command to delete the local consensus instance.

11. The computer-readable storage medium of claim 9, wherein the first transaction command comprises information indicating a node list of the set of nodes, information related to a local consensus identifier specified by an administrator of the block chain, and information related to a consensus algorithm used by the created local consensus instance.

12. The computer-readable storage medium of claim 11, wherein the consensus algorithm comprises at least one of the following algorithms:
    proof of work consensus algorithm;
    proof of stake consensus algorithm;
    delegated proof of stake consensus algorithm;
    Practical Byzantine Fault Tolerance consensus algorithm; and/or
    BFT-RAFT consensus algorithm.

13. The computer-readable storage medium of claim 11, wherein the information related to a consensus algorithm used by the created local consensus instance is determined based on the service demand running on the local consensus instance to be created and the consensus algorithm supported by the block chain.

14. An apparatus for configuring a block chain-based local consensus, the apparatus comprising:
    a memory;
    instructions in the apparatus; and
    processor circuitry to execute the instructions to:
       implement an initialization of a plurality of nodes;
       select a set of nodes from the plurality of nodes according to a service demand running on a local consensus instance to be created; and
       create the local consensus instance for the selected set of nodes by:
          broadcasting a first transaction command for creating the local consensus instance to the nodes in the block chain via one of the plurality of nodes, wherein the nodes in the block chain respond to the first transaction command to create the local consensus instance.

15. The apparatus of claim 14, wherein the first transaction command comprises information indicating a node list of the set of nodes, information related to a local consensus identifier specified by an administrator of the block chain, and information related to a consensus algorithm used by the created local consensus instance.

16. The apparatus of claim 15, wherein the consensus algorithm comprises at least one of the following algorithms:
   proof of work consensus algorithm;
   proof of stake consensus algorithm;
   delegated proof of stake consensus algorithm;
   Practical Byzantine Fault Tolerance consensus algorithm; and/or
   BFT-RAFT consensus algorithm.

17. The apparatus of claim 15, wherein the information related to a consensus algorithm used by the created local consensus instance is determined based on the service demand running on the local consensus instance to be created and the consensus algorithm supported by the block chain.

18. The apparatus of claim 14, wherein the processor circuitry is to execute the instructions to:
   broadcast a second transaction command for deleting the local consensus instance to all the nodes in the block chain after completing the service demand running on the local consensus instance; and
   cause all the nodes in the block chain to respond to the second transaction command to delete the local consensus instance.

* * * * *